May 28, 1929.   F. E. JONES ET AL   1,714,911
BRAKE
Filed March 10, 1924   2 Sheets-Sheet 1

Inventors
FRED E. JONES AND
MONTGOMERY W. McCONKEY
By their Attorneys

May 28, 1929.  F. E. JONES ET AL  1,714,911
BRAKE
Filed March 10, 1924  2 Sheets-Sheet 2
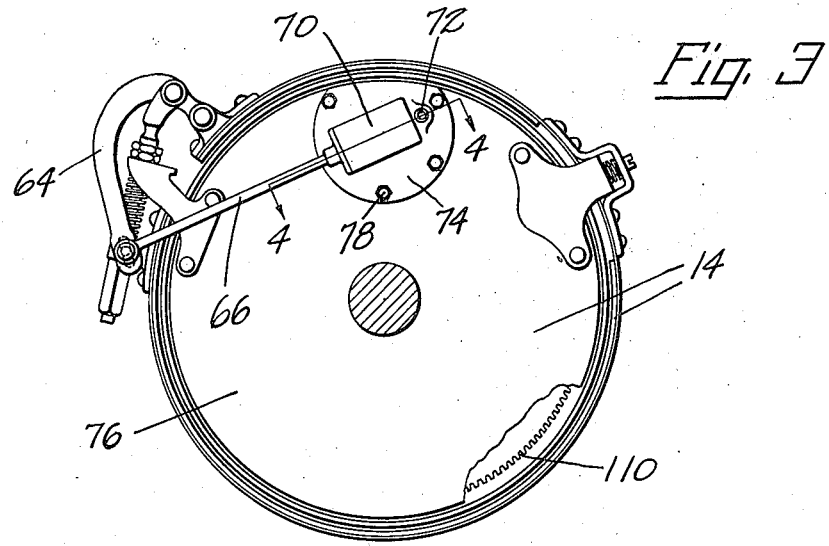
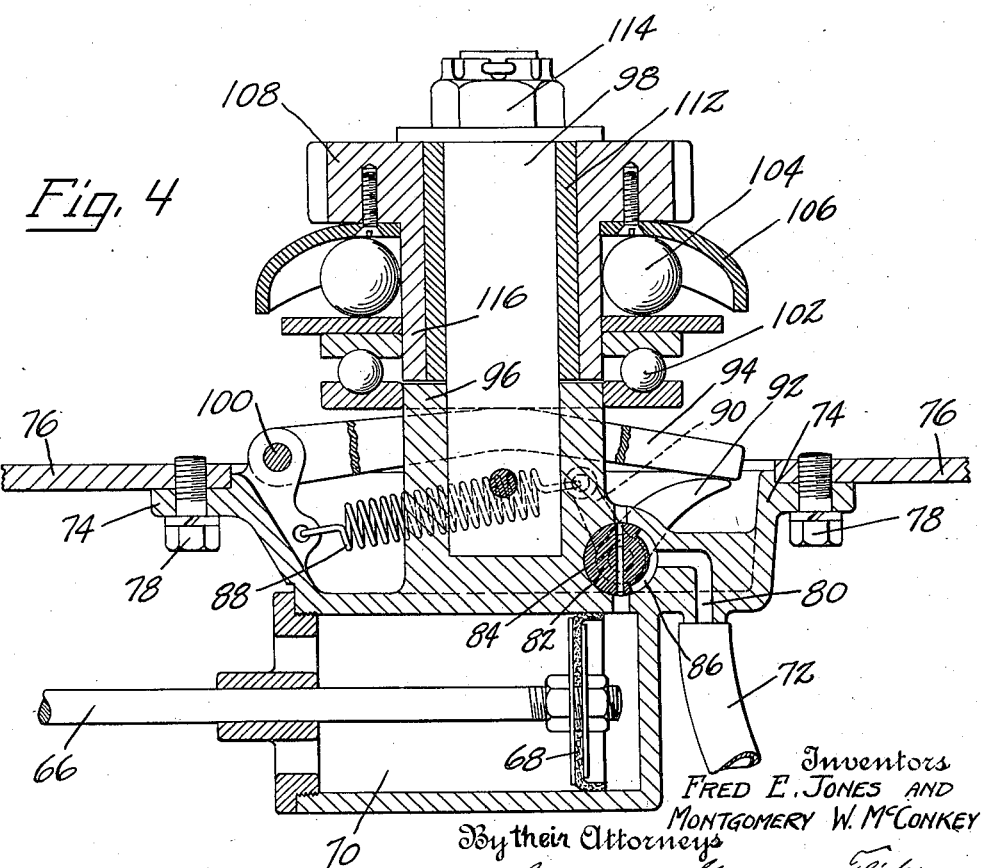
Inventors
FRED E. JONES AND
MONTGOMERY W. McCONKEY
By their Attorneys
Blackmore, Spencer & Fluke Patented May 28, 1929.

1,714,911

UNITED STATES PATENT OFFICE.

FRED E. JONES, OF DETROIT, AND MONTGOMERY W. McCONKEY, OF FERNDALE, MICHIGAN, ASSIGNORS TO GENERAL MOTORS CORPORATION, OF DETROIT, MICHIGAN, A CORPORATION OF DELAWARE.

BRAKE.

Application filed March 10, 1924. Serial No. 698,091.

This invention relates to brakes, and is illustrated as embodied in an automobile chassis having brakes on all four of its wheels.

Heretofore the only practicable non-skidding brakes, i. e. brakes releasing automatically in case of skidding, are of the type utilizing as a brake drum a floating ring frictionally clutched to the wheel by means operated centrifugally by rotation of the wheel, the ring or drum thus being disconnected from the wheel in case of skidding. While these brakes are in the main satisfactory, it is one object of the present invention to provide a non-skidding brake of a different type, lighter and less expensive, while at the same time more sensitive to changes in the speed of rotation of the wheel, by providing rotation-controlled means (shown as a centrifugal governor geared to the wheel to rotate at a high speed) arranged to act on the brake-actuating connections. In the illustrated arrangement the rotation-controlled means operates a valve to control the admission to a brake-operating cylinder of compressed exhaust gases or other fluid under pressure.

Another feature of the invention relates to controlling the compressed gases by a floating valve, preferably in the form of a piston, operated yieldingly by a spring and arranged to yield against the resistance of the spring to cut off the gases when they reach a pressure proportioned to the pressure on the brake pedal or its equivalent, so that the driver retains the "feel" of the brakes even though they are operated by power.

The above and other features of the invention, including various novel combinations of parts and desirable particular constructions, will be apparent from the following description of one illustrative embodiment shown in the accompanying drawings, in which:

Figure 3 is a side elevation, with the axle shown in section, looking outward at one of the front brakes; and Figure 4 is a generally horizontal section on the line 4—4 of Figure 3, showing the centrifugal governor and its connections.

Figure 1:
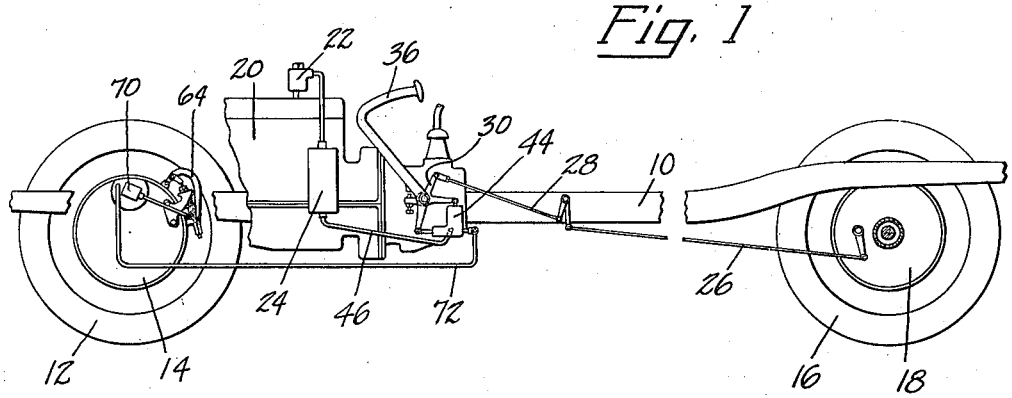
Figure 1 is a diagrammatic longitudinal vertical section through an automobile chassis.

In the arrangement selected for illustration, the invention is embodied in an automobile chassis including a frame 10 supported by springs on front and rear axles carrying front wheels 12 having brakes 14, and rear wheels 16 having brakes 18. The brakes are intended to be actuated ordinarily by compressed gases taken from one cylinder of the engine 20 through a check valve 22 and stored under pressure in a reservoir 24 serving as a source of power for the brakes.

The rear brakes 18 are connected by links 26 and 28 with one end of a bellcrank lever 30 having a lug 32 carrying an adjustable stop 34 in the path of a projection on the pedal 36, so that if for any reason power is not available, the rear brakes can be set by foot power, after a short lost motion of the pedal. The pedal is provided with the usual return spring, not shown.

Figure 2:
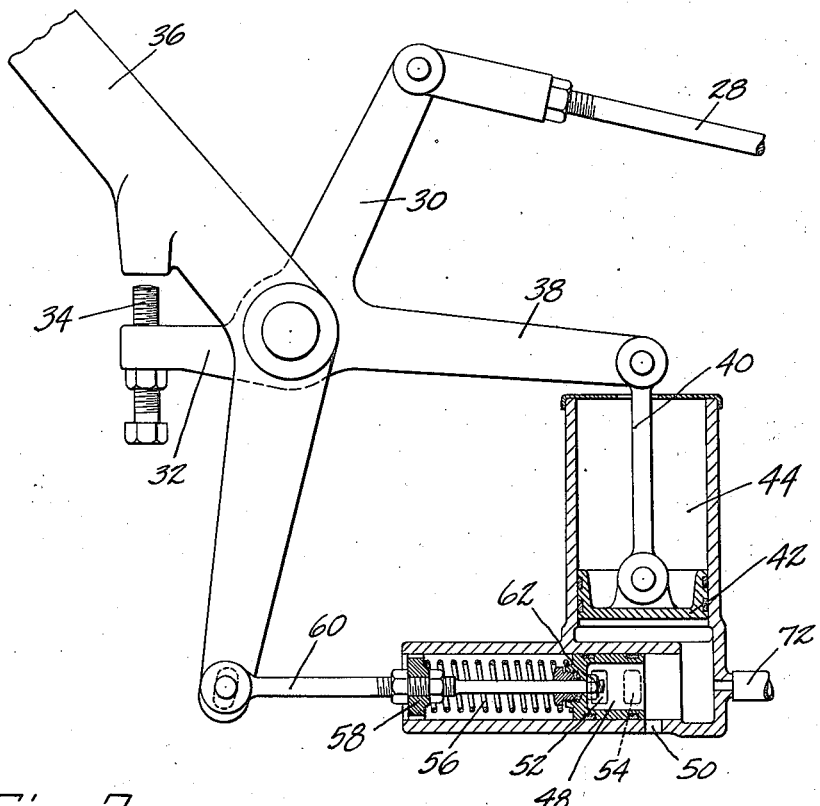
Figure 2 is a view on a large scale showing, partly in side elevation and partly in vertical section, the connections immediately adjacent the brake pedal.

An arm 38 of bellcrank lever 30 is connected by a connecting rod 40 with a piston 42 in an operating cylinder 44, for power operation of the rear brakes. Admission of the compressed gases from reservoir 24 to cylinder 44 through conduit 46 is controlled by a hollow valve piston 48 arranged, when moved to the right in Figure 2, first to close an exhaust port 50 and then to bring a port 52 in its side wall into registry with an intake port 54 communicating with conduit 46. Valve piston 48 is operated yieldingly by a spring 56 engaged by a stop 58 adjustably threaded on a connecting rod 60 pivoted to an extension at the bottom of pedal 36. Preferably rod 60 extends through the head of piston 48 and has a nut 62 to bring the piston positively to its initial or idle position when the pedal is released, thus guarding against the valve sticking.

In the operation of the above described parts, depression of pedal 36 acts through spring 56 to move piston 48, first closing exhaust port 50 and then opening intake port 54. Compressed gases entering from reservoir 24 push upwardly on piston 42, applying the rear brakes. As soon as the reaction on piston 48 from the gases in cylinder 44 equals the pressure on spring 56 from the pedal, or as soon as the braking pressure is a predetermined multiple of the pedal pressure, piston 48 is moved to the left to compress spring 56, closing the intake port 54 and balancing with both ports 54 and 50 closed. If the pedal pressure is increased, intake port 54 again opens until a new balance is obtained; if it is relieved, exhaust port 50 opens temporarily until the valve piston again balances at the lower pressure.

Each front brake has an operating toggle lever 64 of usual form, connected by a connecting rod 66 with a piston 68 in an operating cylinder 70 connected to cylinder 44 by a flexible conduit 72. The cylinder 70 forms part of a casting having a flange or plate portion 74 arranged to be secured to the dust plate 76 of brake 14 by screws 78. The casting is formed with a passage 80 between conduit 72 and cylinder 70 and with a bore for a valve 82 controlling this passage. The valve 82 has a diametric passage 84 arranged in one position to place cylinder 70 in communication with the atmosphere to exhaust the cylinder, and also has a circumferential passage 86 which is closed when passage 84 is open, and which when open places cylinder 70 in communication with conduit 72.

Valve 82 is urged angularly toward exhaust or "closed" position by a spring 88 attached to an arm 90, and is turned against the resistance of the spring in a clockwise direction toward "open" position by an arm 92 engaged by a pivoted yoke 94 straddling a central boss 96 in which is pinned a supporting bolt 98 for the governor mechanism. Yoke 94 is pivoted to the opposite side of the casting at 100. It is operated by a thrust bearing 102 engaged by balls 104 forming part of a centrifugal governor of the well-known "ball" type. Each of the balls 104 is confined in a wedge pocket in a stamping 106 secured to a gear 108 meshing with an internal gear 110 carried by the brake drum. Gear 108 rotates on a bearing 112 on bolt 98, where it is held by a castellated nut 114, and has a sleeve portion 116 abutting against the boss 96 and which serves to receive balls 104 and the adjacent part of the thrust bearing 102. It will be seen that the above described casting, with the brake cylinder and piston, valve, governor, and gear 108, form a sub-assembly which is attachable and removable as a unit.

In operation, if the wheel is not turning, spring 88 holds the parts in the positions shown in Figure 4, with valve 82 in closed or exhaust position so that the brake cannot be applied. This is satisfactory in practice, since when the car is standing still the rear wheel brakes are ample to hold the car. If the car is moving, with the wheel turning, gear 108, which is relatively small, is driven at a high rate of speed by the relatively large gear 110, and the balls 104 are forced outwardly by centrifugal force in their wedge pockets, rocking yoke 94 and arm 92 to open valve 82, thus placing cylinder 70 in communication with cylinder 44. Now if the brake pedal be depressed the front brakes as well as the rear brakes will be applied. If the wheel skids, i. e. stops rotating, whether because of a greasy pavement or because of excessive braking friction, spring 88 is permitted to turn the valve 82 to its original position. If the brake is not at that time on, this merely prevents its application; if the brake is on, this automatically releases it until the wheel is again rotating.

While one illustrative embodiment of our invention has been described in detail, it is not our intention to limit its scope to that embodiment, or otherwise than by the terms of the appended claims.

We claim:

1. A vehicle comprising, in combination, a wheel, a brake for the wheel, a source of fluid power, a conduit connecting said source to the brake to operate the brake, a valve in the conduit to control the application of power to the brake, a spring urging the valve in a direction to shut off the conduit to release the brake, and a device operated by the rotation of the wheel and opening the valve against the resistance of the spring.

2. A vehicle comprising, in combination, a wheel, a brake for the wheel, a source of fluid power, a conduit connecting said source to the brake to operate the brake, a valve in the conduit to control the application of power to the brake, a spring urging the valve in a direction to shut off the conduit to release the brake, a centrifugal device operated by the rotation of the wheel, and a connection operated by the centrifugal device for opening the valve against the resistance of the spring.

3. A brake comprising, in combination, a rotary member, retarding means controlling said member, a manually operable means to apply said retarding means, a governor geared solely to said member, and connections controlled by the governor for rendering the retarding means operative or inoperative.

4. A brake comprising, in combination, a rotary member, a centrifugal governor geared to said member and driven thereby at a substantially greater speed, retarding means operating on the rotary member, means for applying the retarding means, and a device operated by the governor and controlling the retarding means.

5. A brake comprising, in combination, a rotary member, a relatively large gear turning with said member, a centrifugal governor, a small gear driving the governor and meshing with the large gear, retarding means for said rotary member, means for applying the retarding means, and a device operated by the governor and controlling the retarding means.

6. A vehicle comprising, in combination, a plurality of road wheels, a governor directly and independently geared to one of said wheels and driven at a substantially higher speed than the wheel, a manually operable brake for the wheel, means controlled by the governor to render the brake operative whenever the wheel rotates but inoperative whenever the wheel is at rest.

7. A vehicle comprising, in combination, a road wheel, a centrifugal governor geared to the wheel and driven at a substantially higher speed than the wheel, a manually operable brake for the wheel controlled by the governor, and a connection from the governor controlling application of the brake to relieve the braking force when the wheel skids.

8. A vehicle comprising, in combination, a road wheel having a brake, manually operable means for applying said brake, a centrifugal governor geared to the wheel, a fluid cylinder and piston for applying the brake, a valve permitting application of the brake in a first position and preventing application of the brake in a second position, and a connection from the governor for moving the valve from its second to its first position when the governor is driven by the wheel at a substantial speed.

9. A controlling unit comprising, in combination, a supporting plate, a gear supported by the plate, a centrifugal governor between the gear and plate, a power cylinder carried by the plate, and a valve connected to the governor and controlling the admission of power fluid to the cylinder.

10. A vehicle comprising, in combination, front and rear wheels having brakes, driver-controlled means for applying all four brakes, and a device operated by rotation of each front wheel and constructed and arranged to control the corresponding front brake independently of the pressure exerted by said means.

In testimony whereof we affix our signatures.

FRED E. JONES.
MONTGOMERY W. McCONKEY.